United States Patent [19]

Burge

[11] Patent Number: 4,487,403

[45] Date of Patent: Dec. 11, 1984

[54] BENCH MOUNTED WORKPIECE CLAMPING STRAIGHTEDGE

[76] Inventor: Russell W. Burge, 21140 Covina Hills Rd., Covina, Calif. 91724

[21] Appl. No.: 411,602

[22] Filed: Aug. 26, 1982

Related U.S. Application Data

[63] Continuation of Ser. No. 175,292, Aug. 4, 1980, abandoned, which is a continuation of Ser. No. 970,559, Dec. 18, 1978, abandoned.

[51] Int. Cl.³ .............................................. B25B 3/00
[52] U.S. Cl. .................................... 269/2; 269/93; 269/208; 269/221
[58] Field of Search ............... 83/522, 574, 581, 471.3, 83/743, 745, 486.1; 29/251; 269/1, 2, 221–223, 290, 902, 208, 218–220, 249, 91–94; 33/430, 443, 75 R, 75 A

[56] References Cited

U.S. PATENT DOCUMENTS

| 1,457,492 | 6/1923 | Bloodgood | 83/471.3 |
| 1,590,918 | 6/1926 | Tindell | 29/251 |
| 2,308,996 | 1/1943 | Miller | 269/221 |
| 2,871,896 | 2/1959 | Markwell | 269/221 |
| 2,926,387 | 3/1960 | Lombardo et al. | 269/221 |
| 2,942,633 | 6/1960 | King | 83/574 |
| 3,389,724 | 6/1968 | Paul | 83/745 |
| 3,971,552 | 7/1976 | Mayfield | 269/902 |

FOREIGN PATENT DOCUMENTS 1052166  1/1954  France ................... 29/251

Primary Examiner—Robert C. Watson
Attorney, Agent, or Firm—Boniard I. Brown

[57] ABSTRACT

A bench mounted workpiece clamping straightedge to be used in conjunction with portable electric tools such as saws, routers and etc. or manual hand held cutting tools wherein a relatively vertically movable straightedge is utilized to clamp a workpiece firmly and presenting a straightedge with which to guide cutting tools across and or through said workpiece.

1 Claim, 5 Drawing Figures

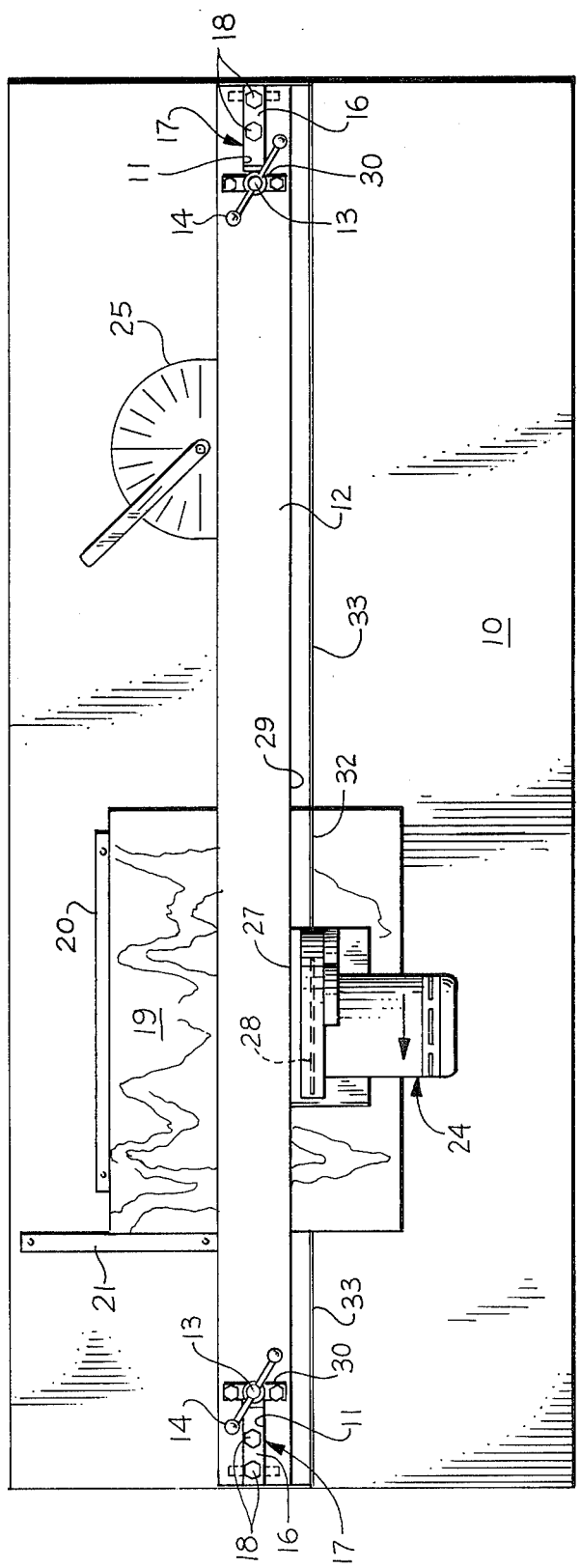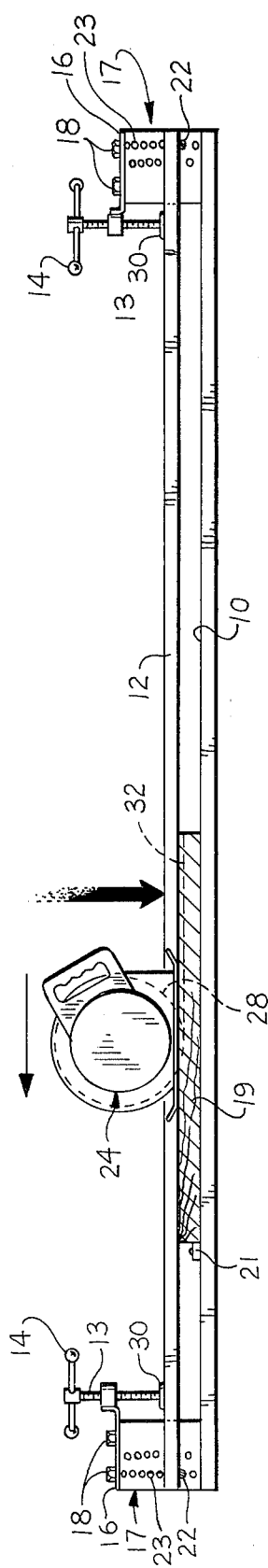

BENCH MOUNTED WORKPIECE CLAMPING STRAIGHTEDGE

This application is a continuation of Ser. No. 175,292, filed Aug. 4, 1980, now abandoned, which in turn is a continuation of Ser. No. 970,559, filed Dec. 18, 1978, now abandoned.

SUMMARY OF THE INVENTION

Past stage of the art generally describes various devices accomplishing similar results of cutting straight lines with elaborate guiding means but with no method to securely hold the workpiece. To anyone skilled in the art it is quite apparent that only a straightedge is necessary to run a power tool or hand tool along to guide it properly similarly as one runs a pencil along a ruler's edge. Therefore a combination of a straightedge member and workpiece clamping device allows safe and accurate cutting, routing, milling, and etc., regardless of how small the workpiece may be.

The principal object of the invention is to provide a bench mounted workpiece clamping straightedge guide for portable power cutting tools such as portable electric saws, electric routers and etc., and to securely clamp the workpiece so that both hands are free to operate the power tool.

A further object of this invention is to provide a bench mounted workpiece clamping device which will allow both hands free to do various manual operations to the workpiece.

A further object of the invention is to provide a workpiece clamping straightedge with a clamping mechanism at each end of the straightedge of such a design as to structurally represent a reverse continuous beam rather than a simple beam, therefore causing high downward clamping forces at midspan and said forces work their way outward towards the clamping mechanism as the clamping pressures are increased. This action results in a clamping pressure the entire length of the straightedge.

A further object of the invention is to provide a workpiece clamping straightedge with a clamping mechanism at one end only of the straightedge of such a design as to structurally represent a reverse cantilever beam causing high downward clamping forces at the end of the straightedge opposite from the clamping mechanism said forces work their way back towards said clamping mechanism as the clamping pressure is increased. This action results in a clamping pressure the entire length of the straightedge.

A further object of this invention provides a maximum amount of safety in operation of electric power hand tools by completely guarding the blade on all sides and burying the bottom portion of the blade into the work and protruding down into a precut slot in the work bench.

A further object of this invention is to provide a bench mounted workpiece clamping straightedge for knives, scribers, glass cutters, leather tools and etc., hand tools to work on any variety of materials.

A further object of this invention is to provide a bench mounting workpiece clamping straightedge with various stops and auxiliary guides, angle guides and etc. to orient the workpiece in various relationships to the straightedge.

A further object of this invention is to provide a bench mounted workpiece clamping device which lifts the clamping device clear of the workpiece providing clearance to place or to remove the workpiece and accurately return the clamping device to the precise position in relationship to the established true cutting line.

Other objects and advantages to the invention will become apparent from the consideration of the following detailed description, taken in connection with the accompanying drawings, wherein a satisfactory embodiment of the invention is shown. However, it is to be understood that the invention is not limited to the details disclosed but includes all such variations and modifications as fall within the spirit and scope of the invention.

BRIEF DESCRIPTION OF THE DRAWINGS

FIG. 1 is a plan view of the bench mounted clamping straightedge in accordance with vertical guide blocks and clamping mechanism at each end, showing a portable electric saw in relationship to the workpiece being cut;

FIG. 2 is a side elevational view of the device of FIG. 1;

DESCRIPTION OF THE PREFERRED EMBODIMENT

Figure 3:
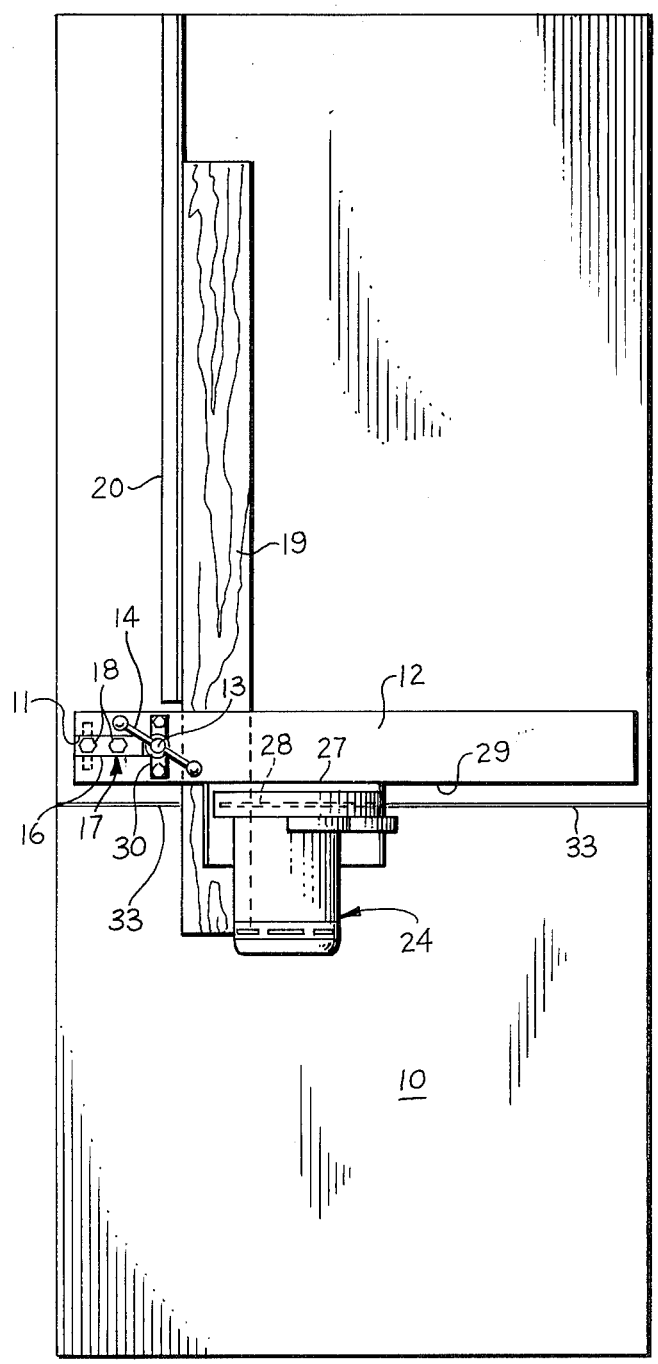
FIG. 3 is a plan view of the bench mounted clamping straightedge with the vertical guide block and clamping mechanism at one end only, showing a portable saw in relationship to the workpiece being cut.
Figure 5:
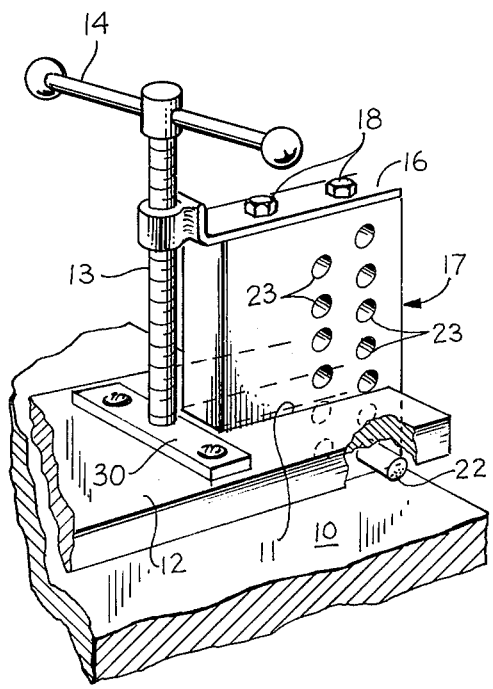
FIG. 5 is a partial perspective view showing a clamping device and guide block assembly utilized with the invention.
Figure 4:
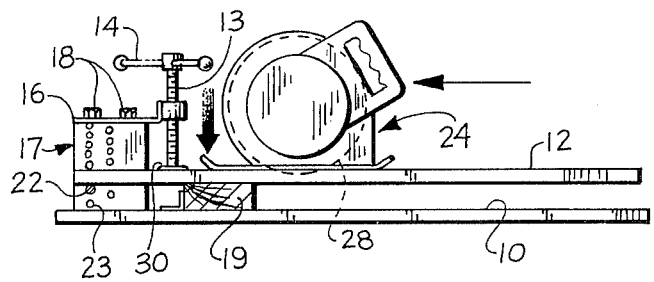
FIG. 4 is a side elevational view of the device of FIG. 3.

Referring to the drawings, a work bench surface 10 has straightedge guide blocks 17 bolted to the work bench surface 10 with guide block bolts 18. Guide block bolts 18 also secure clamp screw nut bar 16 to the top of the guide block 17. Through the clamp screw nut 15 passes the clamp screw 13 which has on the top end the clamp screw handle 14 and at the bottom end fastens to the clamp screw swivel connecting flange 30 which in turn is fastened with screws to the clamping straightedge member 12. The clamping straightedge 12 has a slot 11 shown enlarged in FIG. 4 which has a sliding fit to the straightedge guide blocks 17. One of the clamp closed stop pin holes 23 in the straightedge guide block 17 receives the clamp closed support stop pin 22 depending upon the thickness of the workpiece 19.

In operation the workpiece 19 is positioned on the work bench 10 so that it is held in a preselected position either by the longitudinal cut guide stop 20, the lateral cut guide bench 21, or angle cut guide 25, both of these items 20, 21 and 25 are fastened in a firm adjustable manner. The clamp screw 13 is turned in a clockwise direction by the use of the clamp screw handle 14 lowering the clamping straightedge down on the workpiece 19. When the clamping straightedge 12 comes in holding contact with the workpiece 19 the clamp straightedge 12 also comes in contact with the clamp closed stop pins 22 protruding from a preselected stop pin hole 23 in each of the straightedge guide blocks 17.

The force exerted by clamp screw 13 to the clamping straightedge member 12 between the clamp closed support stop pin 22 and workpiece 19 results in a positive clamping along the entire length of bearing of the clamping straightedge 12 on the workpiece 19. With the end portions of the straightedge member supported by the support pins 22, the forces exerted by the clamping devices, one spaced from each support pin, as shown in FIG. 2, the mid-portion of the straightedge member is bowed downwardly or given a reverse camber, thus insuring firm securement by the straightedge member of the workpiece against the working surface of the bench, or upward bowing of the straightedge member is prevented.

The portable electric saw 24 is put in relationship with the clamping straightedge 12 so that the saw foot side 27 is placed against the saw guide edge 31 of the clamping straightedge 12 with a saw blade 28 protruding below the saw foot 26 for the desired depth of cut. The portable electric saw 24 with the power on is then pushed forward along the saw guide edge 29 in turn cutting a straight preselected line 32 through workpiece 19 along establish saw track 33.

The inventor claims:

1. A workpiece clamping straightedge apparatus for use with a working surface, comprising:

a vertically movable straightedge member being capable of firmly clamping a workpiece between itself and said working surface, said member presenting a straight edge to guide a tool across and/or through said workpiece, at least one clamping means secured to an end portion of said member, said clamping means being capable of lifting said member away from said workpiece and capable of lowering said member into contact with said workpiece, thereby firmly clamping said workpiece between said member and said working surface, at least one mounting means for securing said clamping means to said working surface, said mounting means comprising a vertical member rigidly secured to said working surface and wherein said clamping means is adjustably connected to said mounting means, and said mounting means including an adjustable support means to support an end portion of said member when said member is in contact with said workpiece, to thereby provide downward bowing and reverse camber in said member.

* * * * *